United States Patent [19]

Guerillot

[11] Patent Number: 4,808,008
[45] Date of Patent: Feb. 28, 1989

[54] METHOD OF TRANSMITTING DIGITAL STREAMS OVER HIGHER RATE CHANNELS AND A DEVICE FOR IMPLEMENTING SAME

[75] Inventor: Yves Guerillot, Paris, France

[73] Assignee: Societe Anonyme de Telecommunications, Paris, France

[21] Appl. No.: 61,814

[22] Filed: Jun. 15, 1987

[30] Foreign Application Priority Data

Jun. 16, 1986 [FR] France ................... 86 08638

[51] Int. Cl.$^4$ ............ H04J 3/22; H04L 7/00
[52] U.S. Cl. ................. 370/84; 375/118; 370/101
[58] Field of Search ............ 370/84, 85, 110.1, 60, 370/94, 100, 101; 375/118

[56] References Cited

U.S. PATENT DOCUMENTS 3,213,201 10/1965 Flood et al. .
4,641,303 2/1987 Vogel ................... 370/84

FOREIGN PATENT DOCUMENTS 0049652 4/1982 European Pat. Off. .
2555591 6/1976 Fed. Rep. of Germany .
1316343 5/1973 United Kingdom .

OTHER PUBLICATIONS

Bell Telephone System, Technical Publications, Monograph 4139, May 1962, pp. 1-5; New York, U.S.; W. E. Baker et al., "A Buffer Store for Data Transmission".

Primary Examiner—Douglas W. Olms
Attorney, Agent, or Firm—Stevens, Davis, Miller & Mosher

[57] ABSTRACT

The present invention relates to the transmission of digital information by means of a higher rate channel, the channel having a priori no phase relationship with the primary digital channel, the transmission method comprising chopping the digital stream into packets of p bits, associating with each packet a preamble comprising at least one synchronization word, transmitting the packets at the rate $H_i/p$ and on the reception side restoring the clock associated with the digital stream by dividing by p each time interval separating the arrival of two successive packets.

12 Claims, 5 Drawing Sheets

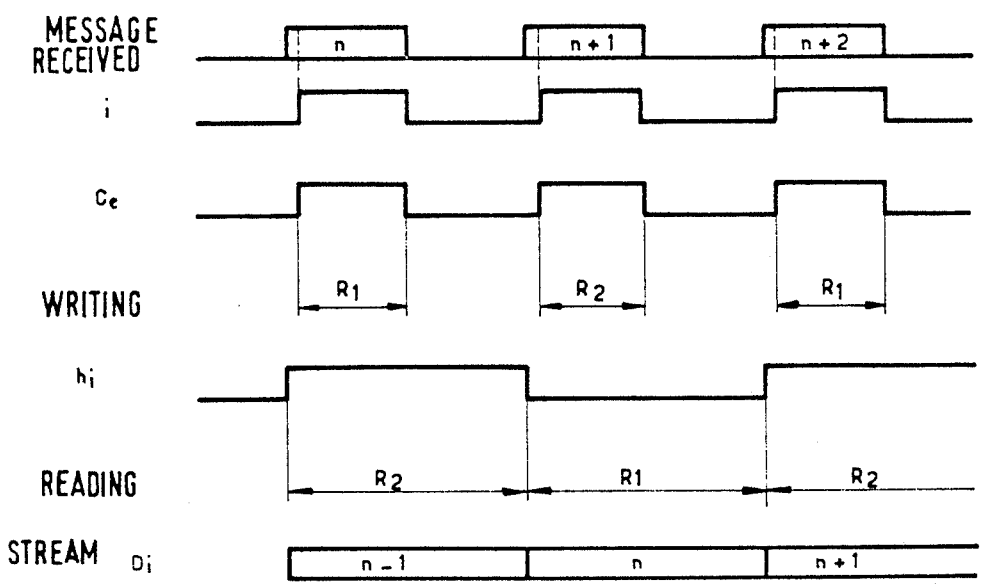
FIG_5_

METHOD OF TRANSMITTING DIGITAL STREAMS OVER HIGHER RATE CHANNELS AND A DEVICE FOR IMPLEMENTING SAME

BACKGROUND OF THE INVENTION

1. Field of the Invention

The present invention relates first of all to a method for transmitting a digital data stream $D_i$, arriving at a first rate, by means of a digital channel having a second rate higher than said first rate, wherein, on emission, the digital stream $D_i$ is chopped into packets of p bits, a preamble comprising at least one synchronization word is associated with each packet and the packets are transmitted over the channel.

The present invention relates then to the transmission of digital information by means of a higher rate channel, the channel having a priori no phase relation with the primary digital channel.

Such problems arise in particular in transmission techniques using short wave links, digital optical cables, or any digital information transmission medium.

2. Description of the Prior Art

A method of the above defined type is already known, described in the article by W. E. Baker et al: "A buffer store for data transmission" BELL TELEPHONE SYSTEM, Technical Publications, Monograph 4139, May 1962, pp 1-5, New York, USA. However, since this method does not provide for recovery of the initial clock signal associated with the digital stream $D_i$, it seems especially adapted to transmission of a synchronous type digital information, that is to say groups of bits separated by dead periods, each group of bits forming for example a character.

The present invention aims at overcoming this drawback by providing a method which, by providing recovery of the initial clock signal, can be very well applied to the transmission of continuous synchronous type digital streams, for which recovery of the clock signal is indispensable.

SUMMARY OF THE INVENTION

For this, the present invention provides a method of the above defined type, wherein:

on the emission side, with a clock signal $H_i$ associated with the digital stream $D_i$, the starting times of the packets are controlled by means of clock signal $H_i$, so that the time interval separating the departure of two successive packets is equal to p times the period of the clock signal $H_i$, and on the reception side, the successive arrival times of the packets are determined by recognizing the synchronization words, and the clock signal $H_i$ is restored by dividing each time interval separating the arrival of two successive packets by p.

The method of the invention overcomes the drawbacks of known techniques. It consists essentially in generating information packets and transmitting these packets with a periodicity derived from the timing of the incoming signal. Restoration of the clock timing at the reception side is derived from the periodicity of arrival of the packets.

Furthermore, if each packet is dimensioned so as to contain a whole number of bytes of information bits, it then becomes possible to transmit a byte synchronization without increasing the complexity of the device. Such a structure is particularly adapted for making a digital channel capable of transmitting a 64 kbit/s signal by offering codirectional type accesses conforming to the recommendation G 703 of the CCITT.

Furthermore, since the digital channel is asynchronous with the timing $H_i$ to be transmitted, the transmission of the packets may be affected by considerable jigging. The purpose of the invention is also to overcome these defects.

For this, and advantageously, with a clock signal $H_c$ associated with the digital channel:

at emission, the time shift between each control time of the starting of a packet and the following transition of the clock signal $H_c$ is determined, the value of the shift is coded in binary form, and it is emitted by means of the binary elements of the preamble, and at reception, the binary elements coding the time shift are received, they are decoded so as to determine the value of said shift, and the phase with which the clock signal $H_i$ is restored is corrected accordingly.

The present invention also provides a device, using the preceding method for transmitting a digital data stream $D_i$, arriving at a first rate, by means of a digital channel having a second rate higher than the first rate, including, on the emission side, means for chopping the digital stream $D_i$ into packets of p bits, means for associating with each packet a preamble comprising at least one synchronization word, means for emitting the packets over said channel and a means for receiving the packets, in which device on the emission side, with a clock signal $H_i$ associated with the digital stream $D_i$, means are provided, controlled by the clock signal $H_i$, for controlling the chopping means so that the time interval separating the departure of two successive packets is equal to p times the period of the clock signal $H_i$, and said reception means comprise means for recognizing the synchronization words, means connected to said recognition means for determining the successive arrival times of said packets, means, connected to the means for determining the arrival times, for dividing each time interval separating the arrival of two successive packets by p, and restoring the clock signal $H_i$, and means controlled by said clock restoring and dividing means for restoring the digital stream $D_i$ from data received over the digital channel.

The system of the invention is extremely flexible and allows operation in a very wide frequency range; this flexibility is to be found not only at the level of the low rate incoming channel but also at the level of the higher rate channel.

BRIEF DESCRIPTION OF THE DRAWINGS

Other advantages and features will be clear from reading the following description illustrated by the drawings:

FIG. 5 shows a timing diagram of the signals present in the device of FIG. 4.

DESCRIPTION OF THE PREFERRED EMBODIMENT

Figure 1:
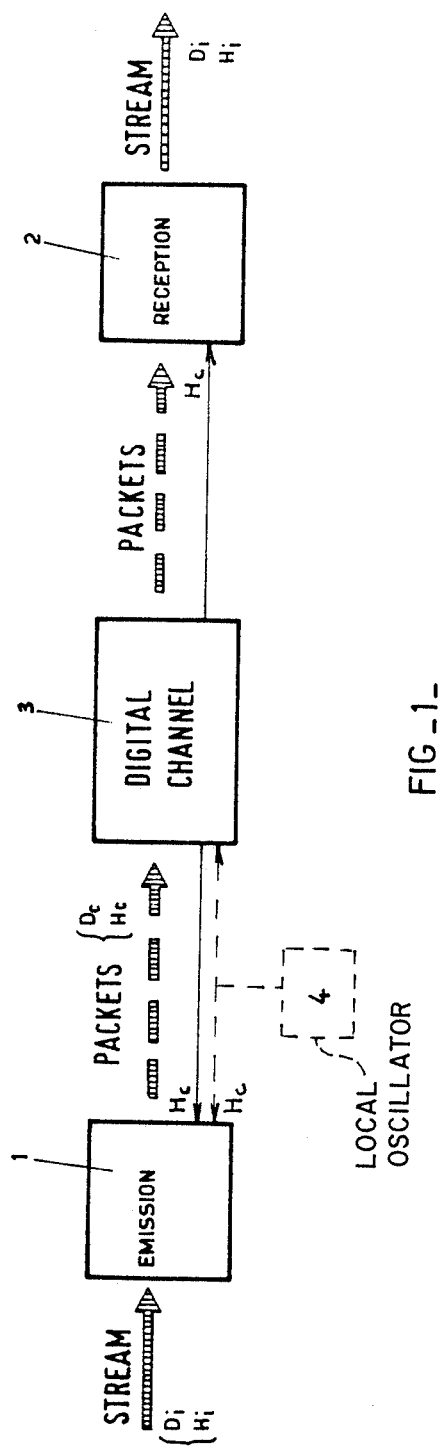
FIG. 1 shows a diagram of a connection in accordance with the invention on the emission side and on the reception side.

Referring to FIG. 1, let us consider a digital stream formed for example of data arriving continuously at a certain rate, the stream having a clock frequency $f_i$. Since it is desired to connect it to a digital channel 3 at a higher rate so having a clock frequency $f_c$ such that $f_c$ is greater than $f_i$, in accordance with the invention a device 1 is provided on the emission side and a device 2 on the reception side for effecting an appropriate transformation of the incoming digital stream on the emission side and the reverse transformation on the reception side.

In one embodiment of the method of the invention, the frequency $f_i$ is equal to 64 kHz but the invention would apply similarly to any clock frequency.

The invention consists essentially in generating, from the incoming digital stream $D_i$, packets of binary elements of constant length and emitting these packets periodically with a periodicity derived from the clock signal $H_i$ of frequency $f_i$, associated with stream $D_i$.

Each packet includes a preamble in addition to useful information.

In the case where the useful information packet is formed of 64 bits, the preamble is advantageously formed by a byte. In particular, in this preamble, five bits may be used for forming a synchronization word for recognizing the beginning of the packet.

Two bits may be attributed to a transmission of useful information for restoral of the clock, as will be explained further on.

The last bit of this preamble byte, finally, may be used for transmitting low rate signalling.

Figure 2:
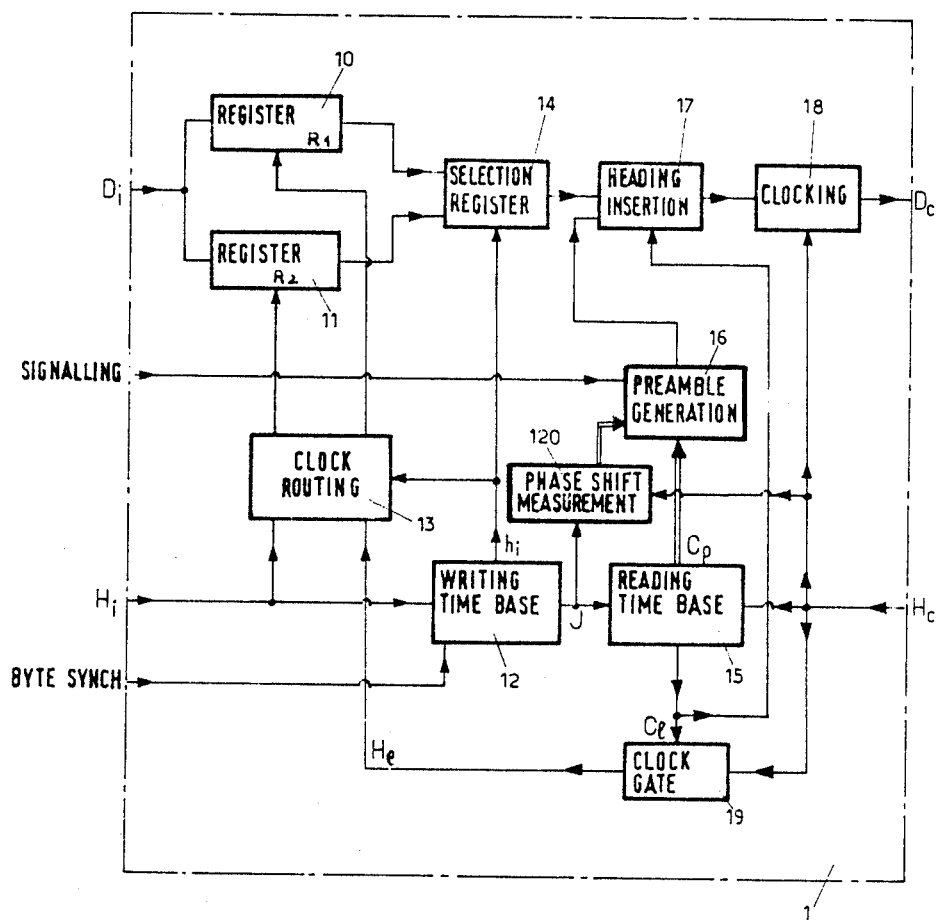
FIG. 2 shows a diagram of the device for generating packets on the emission side from the low rate signal.

FIG. 2 shows, on the emission side, the packet forming device. The digital stream $D_i$ is placed in series in two registers 10 and 11, here shift registers, alternately in blocks of p bits at the timing of the associated clock $H_i$. In the preferred example of the invention, a register dimension is conferred equal to 64 bits. This clock $H_i$ times a writing time base 12 which delivers a signal $h_i$, intended on the one hand for a clock routing circuit 13 and, on the other, for a register selection circuit 14. The clock routing circuit 13 receives, on the one hand, the incoming clock $H_i$ associated with the digital data stream $D_i$ and, on the other hand, the clock Hl for reading the registers 10 and 11 provided by a circuit 19 which will be explained subsequently. Signal $h_i$ is a signal controlling alternately the application of signals $H_i$ and $H_l$ each of the registers 10 and 11. Circuit 13 comprises then simply two switches, each having an input and two outputs.

Signal $h_i$ also controls alternately the reading from each of the registers by means of circuit 14, which is a switch with two inputs and one output. A reading time base 15 is slaved to the clock signal $H_c$ of the high rate digital channel. This time base 15 is triggered by the signal J delivered by the writing time base 12. The period of signal J is p times the period of signal $H_i$. This time base 15 delivers a control signal $C_p$ to the preamble generating device 16. This circuit 16 receives the result of the measurement made by a circuit 120, representing the phase of the clock $H_c$ of the high rate digital channel at the time when the signal J appears for triggering the reading time base 15, that is to say at the control time of the starting of each packet. More precisely, this phase represents the time shift between the control time of the starting of a packet and the next transition of the clock signal $H_c$, that is the time of carrying out of this control.

The result of this measurement made by circuit 120 is applied to circuit 16 and coded by means of two bits written into the preamble message. This preamble message, generated by the circuit 16, is inserted at the beginning of each packet under the control of Cl delivered by the reading time base 15, by means of the circuit 17. "Clocking" means of circuit 18 may be carried out at the output of circuit 17 at the timing of the clock $H_c$ of the high rate digital channel. By "clocking" is meant here a correction of the parasite time shifts, circuit 18 being here a simple D flip flop.

The signal Cl generated by the reading time base 15 causes opening of gate 19 which allows generation of the clock for reading the p bits of each register.

When the p bits have been read, the time base 15 goes back to the stand-by position until a new command J arrives.

Figure 3:
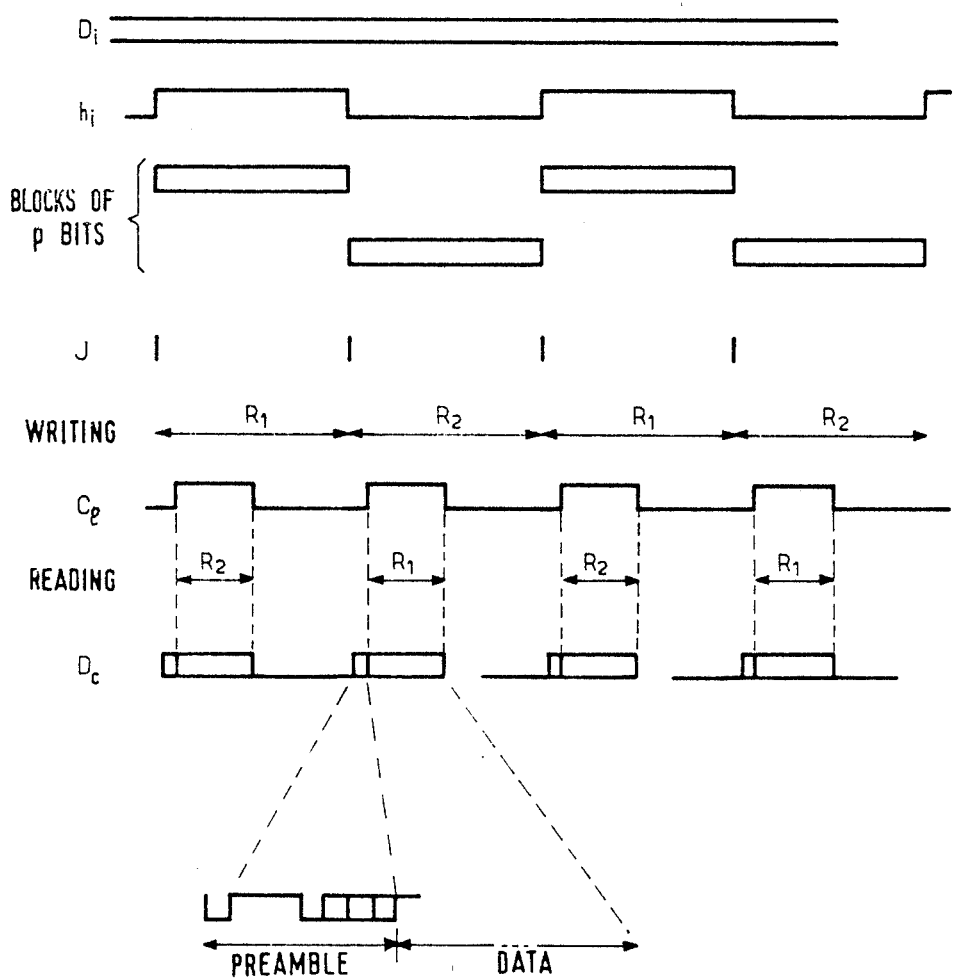
FIG. 3 shows a timing diagram of the signals present in the device of FIG. 2.

The timing diagram of FIG. 3 illustrates this chopping of the digital stream $D_i$ into packets of 64 bits. The data signal $D_i$ is broken up into two groups of packets of 64 bits for example. Signal $h_i$ corresponds to the timing of the packets and its edges allow the signal J to be generated for triggering the writing. Reading of the packets is carried out with a slight delay with respect to writing, because of the insertion of the preamble at the beginning of each packet. The signal Cl for controlling the reading clock gate completes this timing diagram. Such a system obviously involves a reading frequency higher than the writing frequency.

Figure 4:
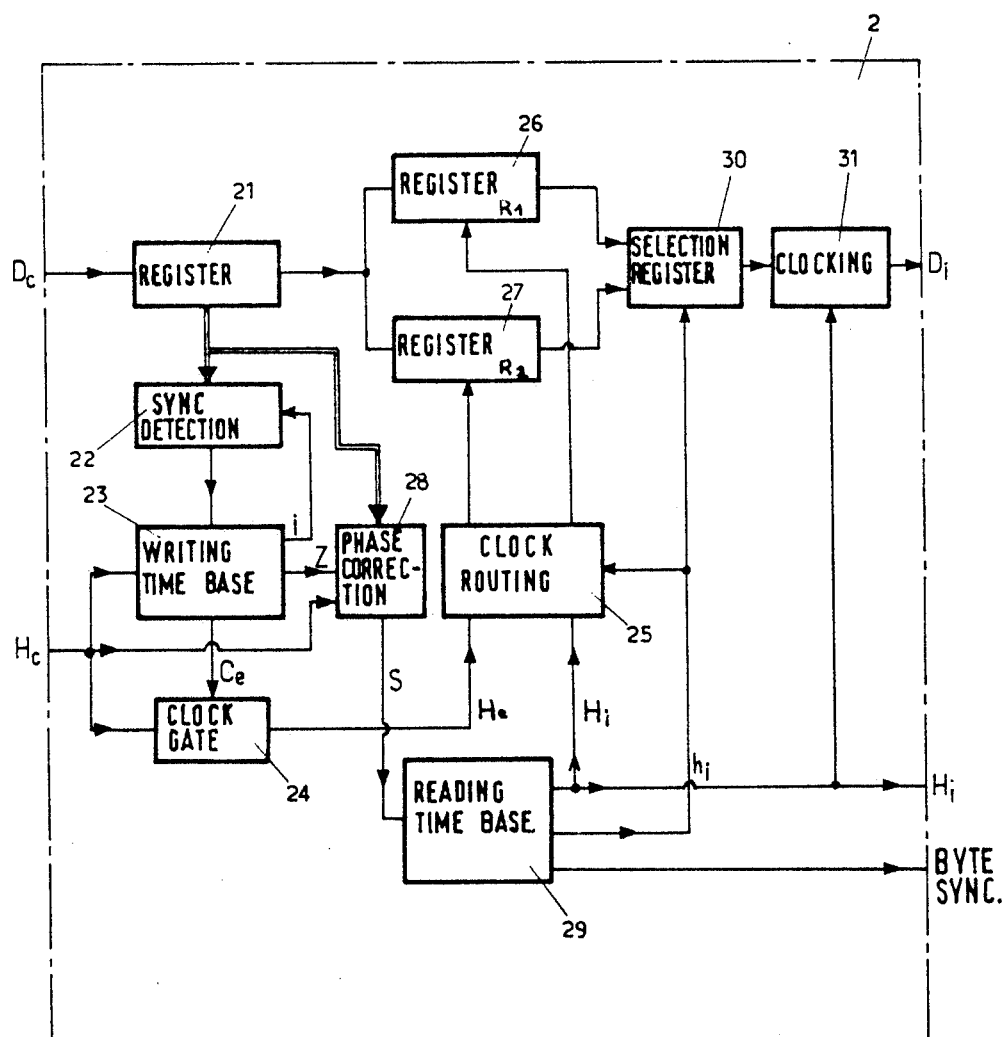
FIG. 4 shows a diagram of the device for receiving low rate signals.

FIG. 4 shows the reception device 2 of FIG. 1. The digital data stream $D_i$ coming from the high rate digital channel is received by means of a first register 21 which, associated with circuit 22, identifies the beginning of the packets by recognizing the synchronization word. Advantageously a synchronization word is chosen formed of five bits.

Recognition of this synchronization word by circuit 22 causes triggering of the writing time base 23 at the timing of the clock signal $H_c$ delivered by the high rate channel. This time base 23 then delivers a command $C_e$ at the input of circuit 24 which generates a clock signal $H_e$ for writing useful data contained in a packet said data being associated with the recognized preamble. This writing is carried out in two registers of p bits 26 and 27 alternately under the control of circuit 25 which switches the clocks $H_e$ and $H_i$ applied to these registers. These registers 26 and 27 are of course shift registers with 64 binary elements, in the example of the invention. Simultaneously, the time base 23 delivers to circuit 22 an inhibition signal i during loading of registers 26 and 27 so as not to have false synchronizations due to imitations during writing of the useful data in registers 26 and 27. The writing time base 23 also delivers a pulse Z which corresponds to the arrival time of each packet to a phase corrector circuit 28. This ciruit 28 modifies the phase signal Z delivered by this time base 23 as a function of the states of the bits 6 and 7 of the preamble byte written into register 21 performing the signal S. This signal S, whose frequency in the example considered is equal to 1 kHz, is then applied to the input of the time base 23 which serves for timing the writing and reading of registers 26 and 27, this reading being controlled by circuit 25 so as to read only a register which was previously loaded. This circuit 25 is identical to circuit 13 and provides selection of the clocks applied to registers 26 and 27 in the alternating progression of their writing and reading cycles. This time base 29 includes a multiplication circuit for multiplying by p, here equal to 64, the frequency of signal S, that is to say for dividing by p the period of this signal, which period corresponds to a time interval separating the arrival of two successive packets. The frequency multiplication circuit includes for example and in a way known per se, an oscillator, here at 64 kHz, a frequency divider dividing by 64 and a phase comparator, arranged so as to form a phase loop. The time base 29 thus restores the clock signal $H_i$ at 64 kHz. This time base 29 also delivers a signal $h_i$ which, applied to circuit 30, controls the selection of register 26 or 27 to be read. Then a "clocking" of the digital stream thus restored is carried out at the timing $H_i$ by means of circuit 31.

The timing diagram of FIG. 5 illustrates the restoration, in accordance with the invention, of a digital signal, for example at 64 kbit/s, from a higher rate channel. The recognition of the synchronization word allows the time base 23 to generate two signals $C_e$ on the same hand and i on the other.

Signal $C_e$ allows data to be written into one of of the two registers 26 or 27.

Signal i inhibits recognition of a synchronization word during writing of the data into these registers 26 and 27.

During this time, the other register is read at the timing of the restored clock $H_i$. The synchronization of the reading time base 29 is such that there is no overlap between writing in and reading out of the same register. Writing into register 27, for example, begins after the end of its preceeding read out, as shown in FIG. 5.

The method transmitting information by packets of p bits in accordance with the invention thus has very great advantages: it is simple to use, and much more flexible than the usual methods of organizing in frames of fixed structure; it also palliates the jigging with which packets may be affected because of the absence of synchronism between the two clocks. In order to reduce this jigging, circuit 120 on the emission side measures the phase of clock $H_i$ at the beginning of sending each packet. The result of this measurement, coded by bits 6 and 7 of the preamble, is used after transmission and decoding for correcting the phase with which the clock signal $H_i$ is restored at reception. This measurement is carried out by circuit 120 from writing and reading clock information delivered by circuits 12 and 15 respectively.

The result is transmitted by means of bits 6 and 7 of the preamble of each packet. Such a phase correction considerably reduces the jigging.

By increasing the dimension of the preamble, it would be further possible to assign a larger number of bits for transmitting phase information and so for obtaining a greater reduction of the residual jigging; The maximum amplitude of jigging $A_m$, expressed in bits of the rate of the restored stream, is related to the number n of bits assigned to the phase information by the following phase relationship:

$$A_m = \frac{1}{2^n} \times \frac{\text{rate to be transmitted}}{\text{rate of the channel}}$$

for example, in the case of a rate of 90 kbit/s in the higher rate channel:

$$A_m = \frac{1}{4} \times \frac{64 \cdot 10^3}{90 \cdot 10^3} = 0.17$$

Furthermore, if each packet is dimensioned so as to contain a whole number of bytes of useful information bits, it then becomes possible, without increasing the complexity of the device, to transmit a byte synchronization. Such a structure is particularly well adapted for making a digital higher rate channel capable of transmitting a 64 kbit/s signal. It is then sufficient to synchronize the sending of the packets by this byte synchronization.

The method of the invention involves a slight increase in rate and thus allows for the higher rate channel a relatively low minimum rate. Thus, in the case of packets of 72 bits formed of a preamble of 8 bits and a data block of 64 bits, the minimum rate of the higher rate channel is 72/64(rate to be transmitted)

That is to say 72 kbit/s in the example considered, that is to say a minimum increase of 12.5%. The upper rate limit is essentially due to the technology used for the construction.

Furthermore, the synchronization word is chosen such that there can be no decoding error in the presence of isolated transmission errors (for example by imitation).

The method of the invention may be also applied for adapting a low rate digital stream to a higher rate digital channel offering a binary interface and codirectional type timing, for example in accordance with the recommendation G 703 of the CCITT. It is then sufficient to provide a local oscillator 4 which generates an appropriate time $H_c$, delivered both to the emission device 1 and to the digital channel 3, as shown with dotted lines in FIG. 1.

What is claimed is:

1. A method for transmitting a digital data stream $D_i$, arriving at a first rate, by means of a digital channel having a second rate higher than said first rate, wherein, on emission, said digital stream $D_i$ is chopped into packets of p bits, a preamble comprising at least one synchronization word is associated with each packet and said packets are transmitted over said channel: wherein on the emission side, with a clock signal $H_i$ associated with said digital stream $D_i$, the starting times of said packet are controlled by means of said clock signal $H_i$, so that the time interval separating the departure of two successive packets is equal to p times the period of said clock signal $H_i$, and on the reception side, the successive arrival times of said packets are determined by recognizing said synchronization words, and said clock signal $H_i$ is restored by dividing each time interval separating the arrival of two successive packets by p.

2. Method according to claim 1, in which with a clock signal $H_c$ associated with said digital channel:

at emission, the time shift between each control time of the starting of a packet and the following transition of said clock signal $H_c$ is determined, the value of said shift is coded in binary form, and it is emitted by means of the binary elements of said preamble, and at reception, said binary elements coding the time shift are received, they are decoded so as to determine said value of said shift, and the phase with which said clock signal $H_i$ is restored is corrected accordingly.

3. Device, transmitting a digital data stream $D_i$, arriving at a first rate, by means of a digital channel having a second rate higher than said first rate, including, on the emission side, means for chopping said digital stream $D_i$ into packets of p bits, means for associating with each packet a preamble comprising at least one synchronization word, means for emitting said packets over said channel and a means for receiving said packets, in which device on the emission side, with a clock signal $H_i$ associated with said digital stream $D_i$, means are provided, controlled by said clock signal $H_i$, for controlling said chopping means so that the time interval separating the departure of two successive packets is equal to p times the period of said clock signal $H_i$, and said reception means comprise means for recognizing said synchronization words, means connected to said recognition means for determining the successive arrival times of said packets, means, connected to said means for determining the arrival times, for dividing each time interval separating the arrival of two successive packets by p, and restoring said clock signal $H_i$, and means controlled by said clock restoring and dividing means for restoring said digital stream $D_i$ from data received over said digital channel.

4. The device according to claim 3, in which with a clock signal $H_c$ associated with said digital channel is further provided:

at emission, means for determining the time shift between each control time of the starting of a packet and the following transition of said clock signal $H_c$, and for coding the value of said shift in binary form, said preamble association means being adapted so as to emit this value of said shift by means of bits of this preamble, and at reception, means for receiving said binary elements coding the time shift and means for decoding them and controlling said clock restoring and dividing means so as to correct the phase with which said clock signal $H_i$ is restored accordingly.

5. The device as claimed in claim 3, wherein said chopping means include two registers each of p bits, both receiving the data of said digital stream $D_i$, means for reading alternately the contents of each register and means for alternatively applying to each register said clock signal $H_i$ and a clock signal of a frequency corresponding to said second rate.

6. The device as claimed in claim 4, wherein said chopping means include two registers each of p bits, both receiving the data of said digital stream $D_i$, means for reading alternately the contents of each register and means for alternately applying to each register said clock signal $H_i$ and a clock signal of a frequency corresponding to said second rate.

7. The device as claimed in claim 3, wherein said digital stream restoring means include two registers each of p bits, both receiving the data of said digital channel and means controlled by said clock restoring and dividing means for alternately reading the contents of each register and for alternately applying to each register said clock signal $H_i$ and a clock signal of a frequency corresponding to said second rate.

8. The device as claimed in claim 4, wherein said digital stream restoring means include two registers each of p bits, both receiving the data of said digital channel and means controlled by said clock restoring and dividing means for alternately reading the contents of each register and for alternately applying to each register said clock signal $H_i$ and a clock signal of a frequency corresponding to said second rate.

9. The device as claimed in claim 5, wherein said digital stream restoring means include two registers each of p bits, both receiving the data of said digital channel and means controlled by said clock restoring and dividing means for alternately reading the contents of each register and for alternately applying to each register said clock signal $H_i$ and a clock signal of a frequency corresponding to said second rate.

10. The device as claimed in claim 6, wherein said digital stream restoring means include two registers each of p bits, both receiving the data of said digital channel and means controlled by said clock restoring and dividing means for alternately reading the contents of each register and for alternately applying to each register said clock signal $H_i$ and a clock signal of a frequency corresponding to said second rate.

11. The device as claimed in claim 3 wherein said digital channel delivers a clock signal $H_c$ corresponding to said second rate, to said emission and reception devices.

12. The device as claimed in claim 3, wherein a local oscillator delivers a clock signal $H_c$ to said digital channel and to said emission device.

* * * * *